United States Patent [19]

Tsuchiya

[11] Patent Number: 5,493,876
[45] Date of Patent: Feb. 27, 1996

[54] CIRCULAR KNITTING MACHINE AND BEARING ASSEMBLY FOR SAME

[75] Inventor: Koji Tsuchiya, Kobe, Japan

[73] Assignee: Precision Fukuhara Works, Ltd., Kobe, Japan

[21] Appl. No.: 314,145

[22] Filed: Sep. 28, 1994

[30] Foreign Application Priority Data

Oct. 12, 1993 [JP] Japan ..................... 5-280211

[51] Int. Cl.$^6$ ............... D04B 9/00; D04B 35/00
[52] U.S. Cl. ................... 66/8; 384/513; 384/905
[58] Field of Search ................. 66/8; 384/493, 384/499, 502, 513, 519, 525, 535, 605, 905

[56] References Cited

U.S. PATENT DOCUMENTS

| | | | |
|---|---|---|---|
| 3,543,367 | 12/1970 | Arnot | 384/513 X |
| 3,880,481 | 4/1975 | George | 384/513 |
| 4,226,485 | 1/1980 | Purvot | 384/905 X |
| 4,473,309 | 9/1984 | Box | 384/905 X |
| 4,489,573 | 12/1984 | Engelfried et al. | 66/8 |
| 4,707,151 | 11/1987 | Kaiser | 384/513 X |
| 5,031,421 | 7/1991 | Engelfried et al. | 66/8 |
| 5,134,863 | 8/1992 | Hanna | |
| 5,211,489 | 5/1993 | Moore | 384/493 X |

FOREIGN PATENT DOCUMENTS

| | | |
|---|---|---|
| 3906773 | 9/1990 | Germany . |
| 4128372 | 3/1993 | Germany . |
| 2-269845 | 5/1990 | Japan . |
| 50022 | 9/1921 | Switzerland ............ 384/535 |

*Primary Examiner*—John J. Calvert
*Attorney, Agent, or Firm*—Bell, Seltzer, Park & Gibson

[57] ABSTRACT

A circular knitting machine is provided that has a bed member and a needle cylinder including a cylinder base rotatably mounted to the bed member. The knitting machine also has a bearing assembly positioned between the bed member and the cylinder base for rotatable mounting of the bed member to the cylinder base. First and second tracks are respectively mounted to the first and second races, and bearings are positionally supported by and between the first and second tracks so that the cylinder base freely rotates about the bed member. A thermal-expansion compensator is preferably integrally formed with either the cylinder base or the bed member and is positioned closely adjacent the corresponding race respectively connected to either the cylinder base or the bed member. The compensator is adapted for compensating for thermal expansion in the cylinder base during heating and cooling thereof. The compensator preferably includes a flexible flange integrally formed with either the cylinder base or the bed member and positioned closely adjacent the corresponding race. The race positioned closely adjacent the flexible flange is preferably slidably connected to the corresponding cylinder base or bed member so that slidably movement of the corresponding race responsive to heating and cooling of the cylinder base thereby moves the flexible flange.

68 Claims, 4 Drawing Sheets

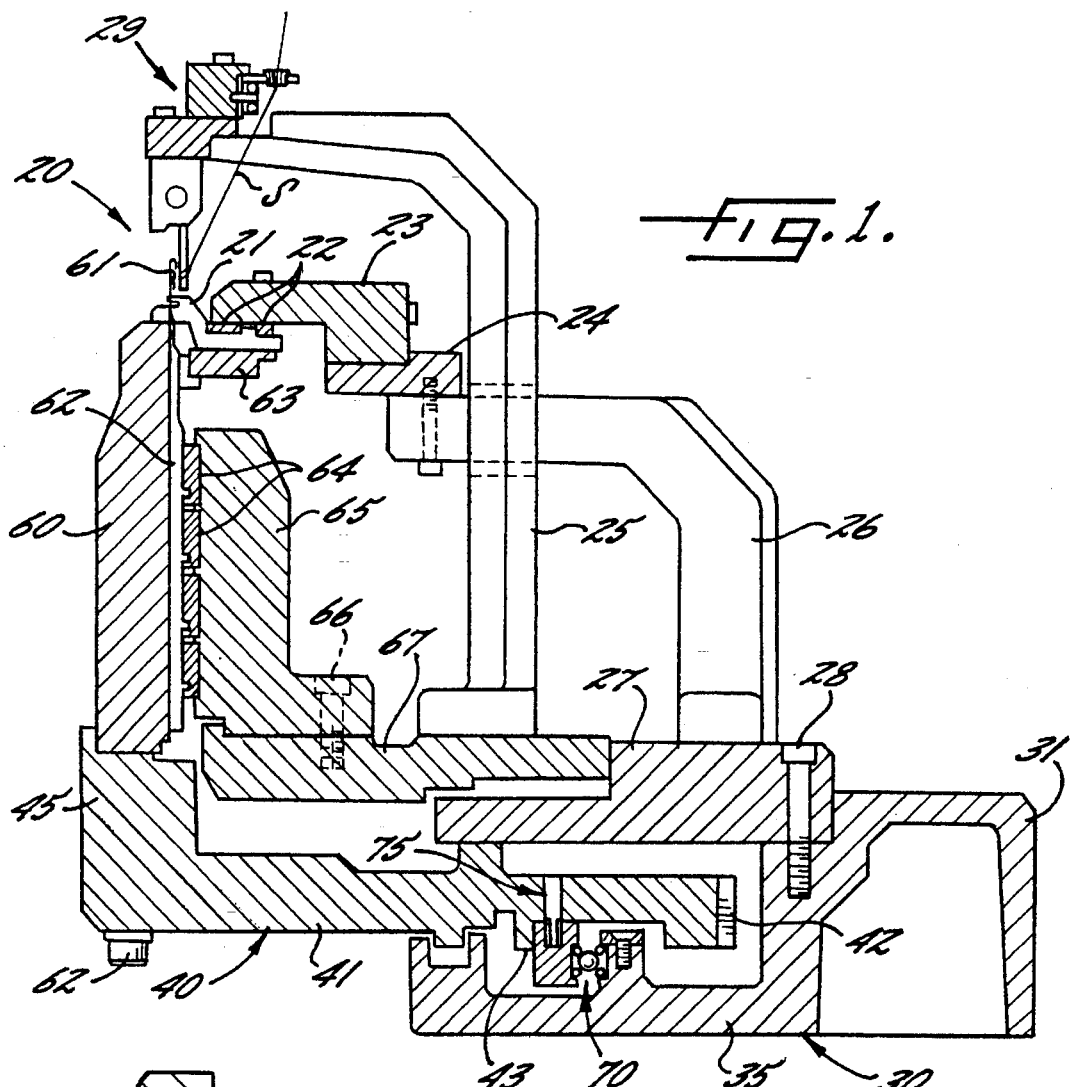
Fig. 1.
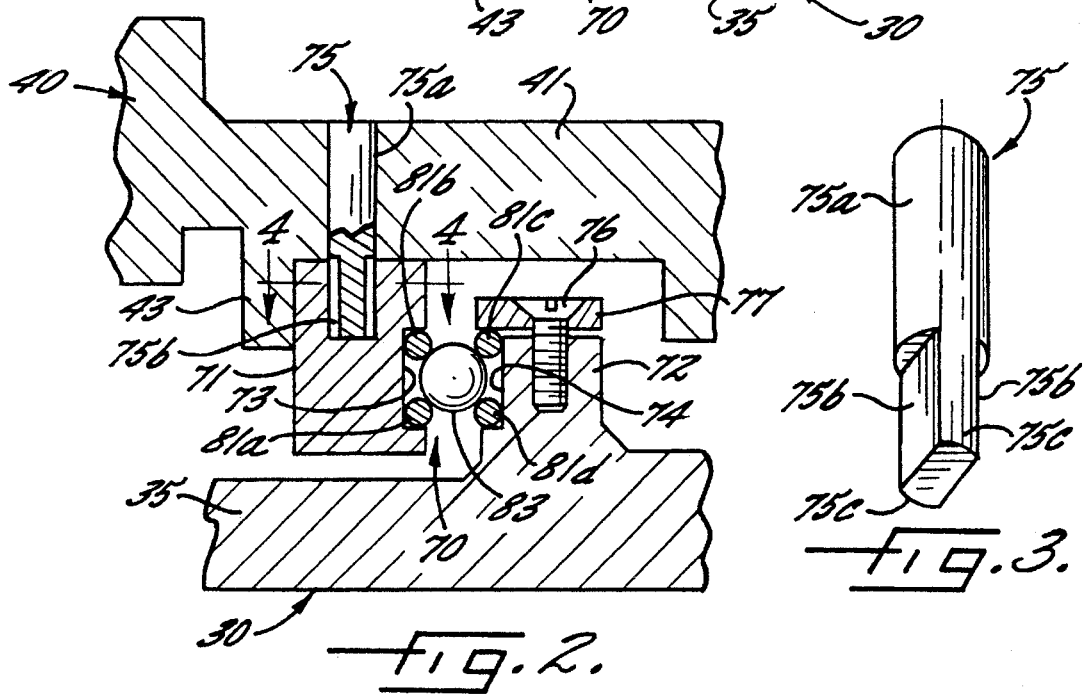
Fig. 2.
Fig. 3.

5,493,876

CIRCULAR KNITTING MACHINE AND BEARING ASSEMBLY FOR SAME

FIELD OF THE INVENTION

This invention relates to a circular knitting machine, and more particularly to a circular knitting machine having a needle cylinder rotatably mounted to a bed member for rotation thereof about the bed member.

BACKGROUND OF THE INVENTION

Circular knitting machines are generally considered a high precision type of knitting machine. Some types of conventional circular knitting machines have a needle cylinder which includes a cylinder base. The cylinder base is conventionally seated in a generally L-shaped bed and is supported in a rotatable manner by a bearing assembly that is positioned between the cylinder base and the L-shaped bed. The bearing assembly conventionally includes pairs of annular wire tracks and a plurality of ball bearings mounted between the pairs of wire tracks.

When this type of circular knitting machine is in operation, the needle cylinder increases in temperature particularly because the knitting tools which are guided in the needle cylinder perform rapid upward and downward movements. As the temperature in the needle cylinder increases, the heat formed therein is transferred from the needle cylinder to the cylinder base causing thermal expansion in and around the cylinder base. When the machine is stopped, however, the ambient atmosphere often cools the cylinder base. A distortion occurs which is caused by these temperature changes, i.e., temperature differential. This distortion substantially affects the machine's accuracy.

In one attempt to solve this problem in this type of circular knitting machine, as described in U.S. Pat. No. 4,489,573 by Engelfried et al. titled *"Circular Knitting Machine,"* the circular knitting machine has an elastic support flange that moves the position of one of the circular wire tracks of a pair thereof responsive to pressure fluctuation (i.e., caused by the thermal expansion of the cylinder base) between the circular wire track and ball bearings. Another non-elastic support flange of the other corresponding circular wire track is anchored in such a way as to cooperate with the elastic support flange. The spacing between the wire tracks of the pair is increased and the wire tracks slide outwardly on the ball bearings. The thermal expansion of the cylinder base is thus compensated.

In the above prior art type of circular knitting machine, however, a preload or pretension is applied to the bearing assembly in order to maintain the machine accuracy. This results in an increased machine torque and, hence, an excessive load to the bearing assembly. This excessive load may cause damage to the bearing assembly thereby inhibiting the operational performance of the circular knitting machine. Moreover, the elastic support flange for holding one of the circular wire tracks also must be thin enough to obtain elasticity; this tends to result in machining distortion which also makes it difficult to obtain a high level of accuracy.

OBJECT AND SUMMARY OF THE INVENTION

An object of the present invention is to provide a more accurate circular knitting machine by compensating for thermal expansion in and around a cylinder base of a needle cylinder of the machine.

It is also an object of the present invention to provide a circular knitting machine that does not apply an excessive load or tension to a bearing assembly positioned between a bed member and a cylinder base of a needle cylinder rotatably mounted to the bed member.

More particularly, the invention meets these and other objects by providing a circular knitting machine that has a bed member and a needle cylinder including a cylinder base rotatably mounted to the bed member. The knitting machine also has a bearing assembly positioned between the bed member and the cylinder base for rotatable mounting of the bed member to the cylinder base. In alternative embodiments, the bearing assembly preferably includes a first race slidably connected to either the cylinder base or the bed member and a second race connected to either the cylinder base or the bed member and positioned adjacent and spaced-apart from the first race. First and second tracks are respectively mounted to the first and second races, and bearings are positionally supported by and between the first and second tracks so that the cylinder base freely rotates about the bed member. Thermal-expansion compensating means is preferably integrally formed with either the cylinder base or the bed member and is positioned closely adjacent the race respectively connected to either the cylinder base or the bed member. The compensating means is adapted for compensating for thermal expansion in the cylinder base during heating and cooling thereof. The compensating means preferably includes a flexible flange integrally formed with either the cylinder base or the bed member and positioned closely adjacent the corresponding race. The race positioned closely adjacent the flexible flange is preferably slidably connected to the corresponding cylinder base or bed member so that slidable movement of the corresponding race responsive to heating and cooling of the cylinder base thereby moves the flexible flange. This configuration of the circular knitting machine and the bearing assembly positioned therein advantageously lessens the tension on the bearing assembly and provides a more accurate circular knitting machine by compensating for thermal expansion in and around the cylinder base. In other words, the bearing assembly does not require an excessive load or tension for smooth and accurate operation.

Also, the present invention includes a bearing assembly adapted for connecting to and positioning between a bed member and a base of a needle cylinder of a circular knitting machine. In alternate embodiments, the bearing assembly preferably has a first non-flexible race adapted to slidably connect to either a base of a needle cylinder or a bed member of a circular knitting machine and a second non-flexible race adapted to connect to either a base of a needle cylinder or a bed member of a circular knitting machine. The second race is positioned adjacent and spaced-apart from the first race. The first and second races each have an opposingly facing channel positioned therein. First and second spaced-apart pairs of tracks are respectively positioned in the channel of the first race and in the channel of the second race. A plurality of bearing balls preferably are positionally supported by and between the first and second pairs of tracks so that the base of the needle cylinder freely rotates about the bed member. Thermal-expansion compensating means is integrally formed with either the base of the needle cylinder or the bed member and positioned closely adjacent either the first or second corresponding race for compensating for thermal expansion in the base during heating and cooling thereof. The compensating means preferably includes a connector slidably connecting either the first or second race to either the base or the bed member and a flexible flange integrally formed with the base and positioned closely adjacent the second race so that the second race slidably moves responsive to heating and cooling of the base of the needle cylinder and thereby moves the flexible flange. The thermal expansion of the cylinder base is therefore indirectly compensated by the position of and the movement of the flexible flange.

BRIEF DESCRIPTION OF THE DRAWINGS

Some of the objects and advantages of the present invention having been stated, others will become apparent as the description proceeds when taken in conjunction with the accompanying drawings in which:

FIG. 1 illustrates a side sectional view of portions of a circular knitting machine having a needle cylinder supported by a cylinder base rotatably mounted to a bed member according to a first embodiment of the invention;

FIG. 2 illustrates an enlarged sectional view of a bearing assembly of FIG. 1 according to a first embodiment of the circular knitting machine of the present invention;

FIG. 3 illustrates an enlarged perspective view of a connecting pin for a bearing assembly of a circular knitting machine according to a first embodiment of the present invention;

DETAILED DESCRIPTION OF A PREFERRED EMBODIMENT

Figure 4:
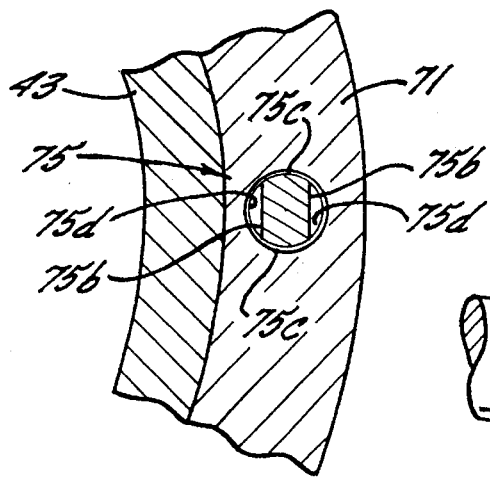
FIG. 4 illustrates a sectional view of a first race slidably connected to a cylinder base of a circular knitting machine taken along line 4—4 of FIG. 2.

The present invention will now be described more fully hereinafter with reference to the accompanying drawings in which typical preferred embodiments are shown. This invention, however, may be embodied in many different forms and should not be construed as limited to the illustrated embodiments set forth herein; rather, these embodiments are provided so that this disclosure will be thorough and complete and will fully convey the scope of the invention to those skilled in the art. Like numbers refer to like elements throughout.

FIG. 1 illustrates a side sectional view of a circular knitting machine 20 according to a first embodiment of the present invention. The circular knitting machine 20 has a frame which includes a yarn-feed frame support member 25 and a sinker frame support member 26. As understood by those skilled in the art, the yarn-feed frame support member 25 supports a yarn-feed assembly 29 as illustrated. The sinker frame support member 26 is preferably connected to a bed member 30 by a ring plate 27 and a fastener, such as a screw 28. The sinker frame support member 26 also likewise supports a sinker assembly which conventionally includes sinkers 21 and sinker cams 22 positioned to operationally engage the sinkers 21. The sinkers 21 and the sinker cams 22 are supported on the sinker frame support member 26 by a sinker support ring 23 and a sinker ring plate 25 respectively connected to the sinker cams 22 and the sinker frame support member 26 as illustrated.

The circular knitting machine 20 also includes a needle cylinder 60 rotatably mounted on a cylinder base 40. The needle cylinder 60 has vertical grooves in the outer periphery thereof in which there are slidably mounted needles 61. Butts 62 on the needles 61 operationally engage needle cams 64. The needle cams 64 are mounted on a cam plate member 65 which in turn is mounted on a cam support ring 67 by a fastener, such as a screw 62.

The present invention is more particularly directed to the needle cylinder 60 and the cylinder base 40 of the circular knitting machine 20 and the accuracy problems associated with a conventional circular knitting machine when in operation. The construction and operational characteristics of the yarn-feed assembly 29, the sinkers 21, the needle cylinder 60, and the needles 61 are known to those skilled in the art. Accordingly, for brevity purposes, the remaining description will be directed to the needle cylinder 60, the cylinder base 40, and the rotatable mounting of the cylinder base 40 on the bed member 30 of the circular knitting machine 20.

As also illustrated in FIGS. 1 and 2, the cylinder base 40 of the needle cylinder 60 is preferably rotatably mounted to the bed member 30. The bed member 30 is preferably supported by the frame of the circular knitting machine 20, has a generally L-shape as illustrated, and includes a bed body 31 and a generally horizontal extending bed leg member 35. The cylinder base 40 likewise preferably has a base body 45 and a generally horizontal extending base leg member 41 preferably mounted in a rotatable manner to the bed leg member 35 as illustrated so that the cylinder base 40 rotates about the bed member 30. The needle cylinder 60 is preferably secured to the cylinder base body 45 by means of fasteners such as a bolt or screw 62. The cylinder base leg member 45 also has an engraved gear 42 connected to an outer end thereof and is preferably driven by a drive source positioned outside of the knitting machine 20 such as through a pinion (not shown).

When a circular knitting machine 20 is in operation, the needle cylinder 60 often increases in temperature particularly because the needles 61 mounted in the needle cylinder 60 performs rapid upward and downward movements. As the temperature in the needle cylinder 60 increases, the heat formed therein is transferred from the needle cylinder 60 to the cylinder base 40 causing thermal expansion in and around the cylinder base 40. When the machine 20 is stopped, however, the ambient atmosphere often cools the cylinder base 40. A distortion often occurs which is caused by these temperature changes, i.e., temperature differential. This distortion substantially affects the machine's accuracy.

To address this problem, a bearing assembly 70 according to the present invention preferably connects to, is integrally formed with, and is positioned between the cylinder base 40 and the bed member 30 as illustrated by the various embodiments in FIGS. 1–15. The bearing assembly 70 is adapted and constructed to particularly compensate for thermal expansion in and around the cylinder base 40 by including means for compensating for this thermal expansion. On a lower end of the base leg member 45 of the cylinder base 40, the bearing assembly 70 has a portion of thermal expansion compensating means illustrated in the form of a flexible annular base flange 43 which is preferably integrally formed with the cylinder base 40. Although preferably relatively thin, the desired thickness of this flexible annular base flange 43 may vary and fluctuate according to the material of the base flange 43 and/or other factors. An optimum value for this thickness, therefore, is preferably experimentally determined for the machines 20.

Outside and adjacent the flexible annular base flange 43, the bearing assembly also preferably includes a first non-flexible annular race 71. The first race 71 is preferably slidably connected to the base leg member 45 and is positioned closely adjacent the flexible annular base flange 43. Opposite the first race 71, a second non-flexible annular race 72 is preferably formed integral with the bed member 30 and extends upwardly from the bed leg member 35. The bearing assembly 80 also preferably includes a plurality of annular wire tracks 81a–81d, i.e., four wire tracks arranged in opposing first and second pairs as illustrated, and a plurality of bearing balls 83 positioned between the wire tracks 81a–81d. Although the first and second pairs of tracks are described as wire tracks, it will be understood by those skilled in the art that these tracks may be formed of various metals and alloys thereof as well as various polymeric materials and the like.

FIGS. 2–4 also illustrate the connecting of the first race 71 to the cylinder base 40. The configuration of the first race 71 and the connecting of the race 71 to the cylinder base 40 also form portions of the thermal expansion compensating means of the bearing assembly 70. The cylinder base 40 and the first race 71 are slidably connected to each other in a separable manner by means of a plurality of connecting pins 75 (as best shown in FIGS. 2 and 3). FIG. 4 illustrates a sectional view of the cylinder base 40 and the first race 71 slidably connected thereto taken along line 4—4 of FIG. 2. The first race 71 is detachably connected to the cylinder base 40 so that heat is not easily transmitted from the cylinder base 40 to the first race 71.

As illustrated in FIG. 3, each of the connecting pins 75 preferably has a cylindrical upper end portion 75a and a lower end portion having a first pair of relatively flat and parallel sides 75b, i.e., cut-away portions, and a second pair of arcuate sides 75c. The base leg member 41 of the cylinder base 40 preferably has a bore positioned therein, and the first race 71 likewise has a bore positioned therein. These bores preferably have a generally similar-sized circumference and are preferably positionally aligned so that the upper portion 75b of the connecting pin 75 is positioned within the bore of the base leg member 41 and the lower portion is positioned within the bore of the first race 71. The lower portion of the connecting pin 75 also preferably has a smaller circumference than the upper portion 75a.

The connecting pins 75 are therefore installed in such a way as to provide radial spaces 75d as best illustrated in FIG. 4. Preferably surrounding the parallel and arcuate sides 75b, 75c of the lower portion of the pin 75, the first race 71 also provides a small gap or slightly enlarged portion of the bore illustrated by the circle surrounding the pin 75. This small gap in combination with the radial spaces 75d allows the first race 71 to slidably move inward when the cylinder base 40 expands by heat. Because the cylinder base 40 is connected by means of the connecting pins 75, it rotates together with the first race 71.

FIG. 2 also illustrates that the bearing assembly 70 preferably has a plurality of bearing balls 83 and annular wire tracks 81a, 81b, 81c, 81d. The bearing balls 83 are supported by the annular wire tracks 81a–81d and preferably form first and second pairs. A first pair of the annular wire tracks 81a, 81b is accommodated within a concave groove or channel 73 of the first race 71, and the other pair of annular wire tracks 81c, 81d is accommodated within a concave groove or channel 74 of the second race 72 respectively as illustrated. The contact points between the bearing balls 83 and the annular wire tracks 81a–81d are preferably chamfered (not shown) so as to accommodate the arcuate portions of the bearing balls 83. The second race 72 also preferably includes a body portion integrally formed with the bed leg member 35 of the bed member 30. The body portion has a lower flange positioned along a lower end of the channel 74 of the second race 72, and an upper flange member 77 is preferably mounted with a fastener such as a screw 76 for spacing or gap adjustment of the annular wire tracks 81c, 81d. Portions of the upper flange member 77 are positioned along the upper end of the channel 74. The fastener is adapted for adjusting the position of the second pair of wire tracks 81c, 81d within the channel 74.

Figure 13:
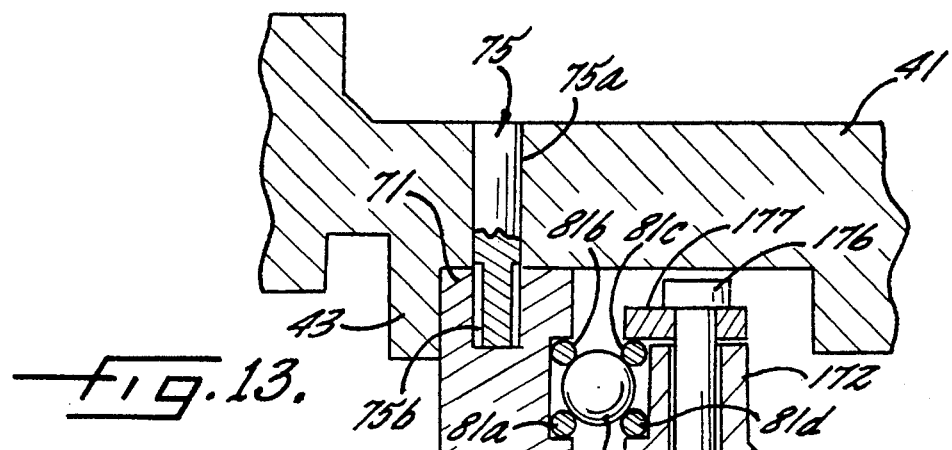
FIG. 13 illustrates a side sectional view of a seventh embodiment of a bearing assembly positioned between a cylinder base and a bed member of a circular knitting machine according to the present invention.
Figure 14:
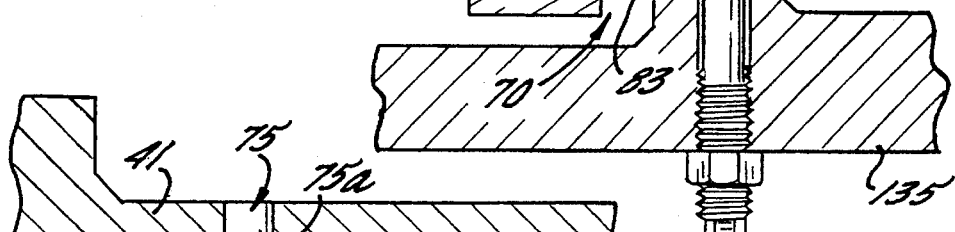
FIG. 14 illustrates a side sectional view of an eighth embodiment of a bearing assembly positioned between a cylinder base and a bed member according to the present invention.

In alternate embodiments of a bearing assembly 70, such as illustrated in FIGS. 13–14, the fastener 176, 276 may also extend to and through a body portion of the second race 172, 272 and extend to and through the bed leg member 135, 235 of the bed member 30 for providing easier access to adjustably position the second pair of wire tracks 81c, 81d and the spacing therebetween, i.e., gaps. In these embodiments, the fasteners 176, 276 are illustrated in the form of a threaded bolt which screws into a threaded portion formed in the lower portion of the bed 30. The bolt 176, 276 is also positioned through the upper flange member 177, 277 and is fastened with a nut. The gaps are preferably adjusted by loosening the nut and rotating a lower end of the bolt.

Figure 5:
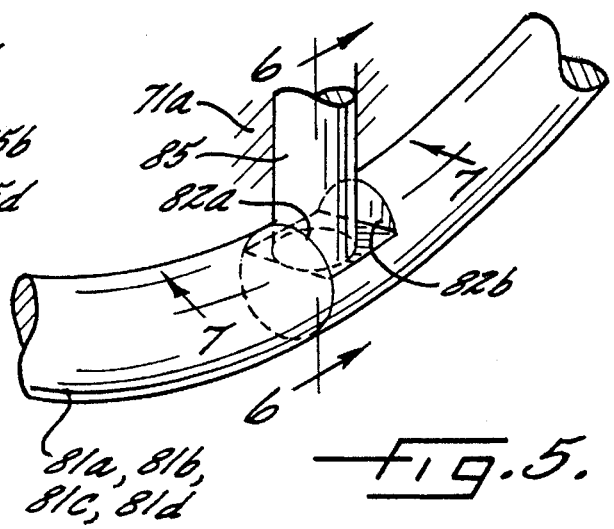
FIG. 5 illustrates a fragmentary perspective view of an annular wire track and a stopping member engaging the wire track and mounted to a first race according to a first embodiment of the present invention.
Figure 6:
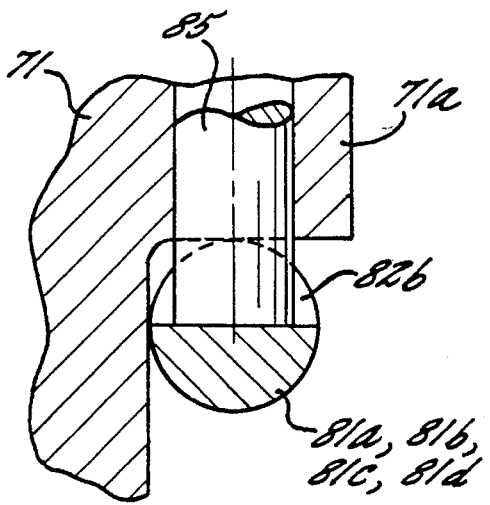
FIG. 6 illustrates a sectional view of an annular wire track and a stopping member taken along line 6—6 of FIG. 5 according to a first embodiment of the present invention.
Figure 7:
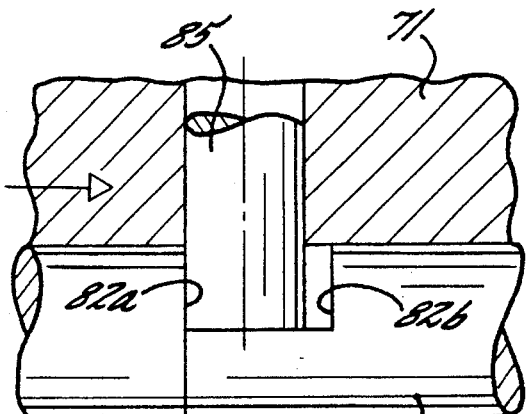
FIG. 7 illustrates a sectional view of an annular wire track and a stopping member taken along line 7—7 of FIG. 5 according to a first embodiment of the present invention.

As best illustrated in FIGS. 5–7, the bearing assembly 70 also preferably includes stopping means respectively mounted to the first and second races 71, 72 and contactingly engaging each of the wire tracks 81a–81d. The stopping means is illustrated in the form of two opposing ends of the annular wire tracks 81a–81d. Each wire track 81a–81d preferably has a relatively flat first end 81*a* of generally the same circumference and shape as the respective wire track 81*a*–81*d* and a cut-away portion 81*b* on a second end. Between the first end 81*b* and the cut-away portion 81*b* of the second end, a lower end portion of an engaging pin 85 contactingly engages therewith. An upper end portion of the engaging pin 85 is mounted to a portion 71*a* of the race that accommodates the annular wire tracks 81*a*–81*d* such as the first race 71 illustrated. Therefore, a sliding motion of the annular wire tracks 81*a*–81*d* which is possibly generated along with the rotation of the machine 20 (indicated by the arrow in FIG. 7) is stopped by the engaging pin 85.

According to the thermal expansion compensating means, i.e., thermal expansion compensator, of the first embodiment of the present invention shown in FIGS. 1–7 above, the heat of the needle cylinder 60 that occurs during the operation of the knitting machine 20 is transmitted to the cylinder base 40 causing it to thermally expand. The thermal expansion of the cylinder base 40 is inhibited by the second non-flexible race 72 of the bearing assembly 70. The expansion of the cylinder base 40 thus inhibited then presses the first race 71 inward responsive thereto. The pressed first race 71 slidably moves about the connecting pins 75 responsive to the heating and cooling of the cylinder base 40 and then distorts the flexible annular base flange 43 of the cylinder base 40 inward. This distortion compensates for the thermal expansion of the cylinder base 40. This configuration and construction of the first non-flexible race 71 and the second non-flexible race 72 of the bearing assembly 70 of the present invention helps maintain the accuracy of the circular knitting machine 20 by indirectly compensating for the thermal expansion in and around the cylinder base 40. This configuration also lessens the load on the bearing assembly 70. In other words, the bearing assembly 70 does not require an excessive load or tension for smooth and accurate operation.

Figure 8:
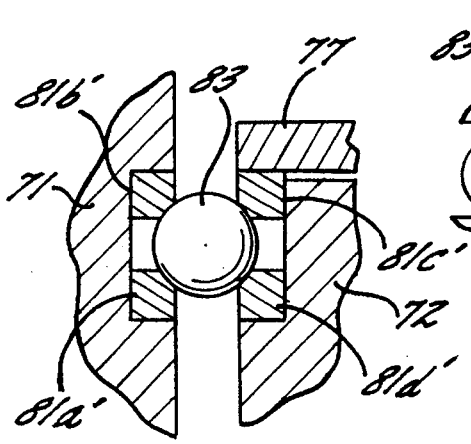
FIG. 8 illustrates a fragmentary sectional view of a second embodiment of a bearing assembly having non-circular wire tracks according to the present invention.

FIG. 8 illustrates another embodiment of a bearing assembly 70 of a circular knitting machine according to the present invention. Instead of the previously described annular wire tracks 81*a*–81*d* having circular cross-sections, the wire tracks 81*a'*–81*d'* may have a non-circular cross-section such as the rectangular cross-sections illustrated, as well as others. The wire tracks 81*a'*–81*d'* of this embodiment also preferably have chamfered portions that surface-contact the bearing balls 83 positioned therebetween.

Figure 9:
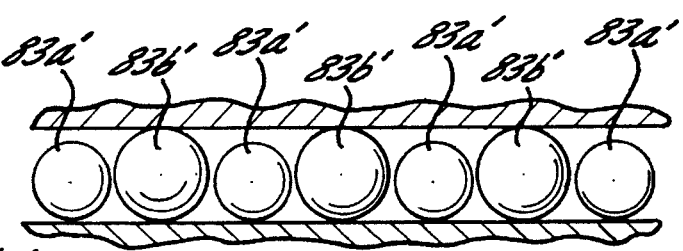
FIG. 9 illustrates an enlarged fragmentary sectional view of a third embodiment of a bearing assembly having bearing balls of differing diameters according to the present invention.

FIG. 9 illustrates yet another embodiment of a bearing assembly 70 of a circular knitting machine according to the present invention. The bearing assembly 70 in this embodiment has bearings in the form of bearing balls 83*a'*,83*b'* of different diameters positioned between the pair of tracks 81*a*–81*d*, and arranged alternately so as to minimize collisions between neighboring bearing balls 83*a'*,83*b'*.

Figure 10:
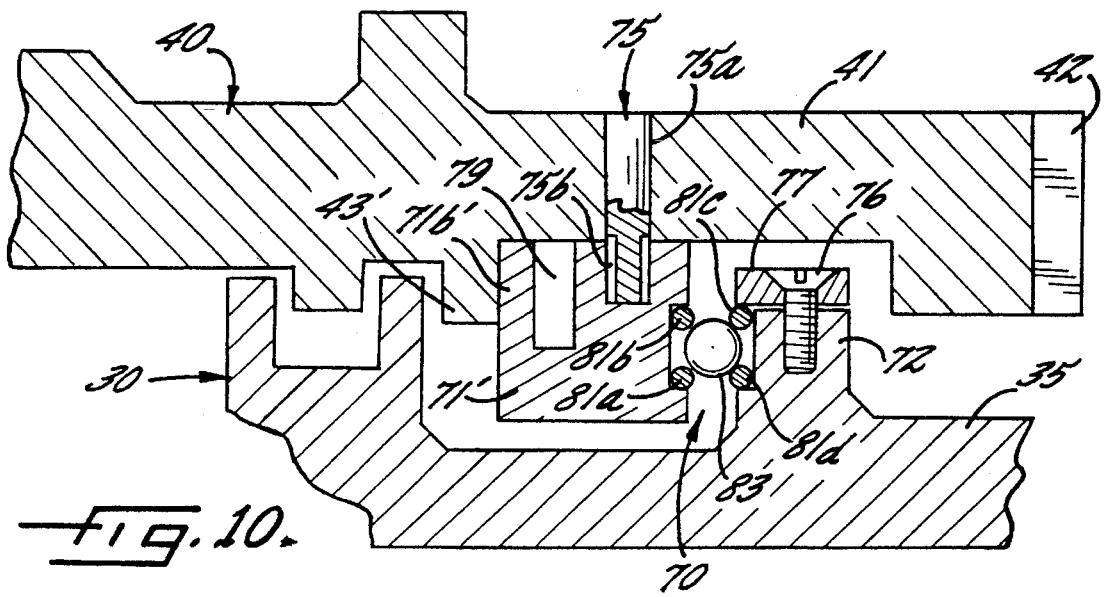
FIG. 10 illustrates a side sectional view of a fourth embodiment of a bearing assembly positioned between a cylinder base and a bed member of a circular knitting machine according to the present invention.

FIGS. 10–12 and 15 illustrate additional embodiments of a bearing assembly 70 of a circular knitting machine 20 according to the present invention. Like elements in these various embodiments of the bearing assembly 70 according to the present invention have been designated with prime (') or double-prime (") notation throughout. FIG. 10 illustrates a side sectional view of a bearing assembly 70 according to a fourth embodiment of the present invention. The fourth embodiment differs from the first embodiment in that the fourth embodiment preferably has a first annular race 71' that is provided with a flexible annular flange 71*b'* and a cylinder base 40 that is provided with a non-flexible annular flange 43', i.e., corresponds to the flexible annular flange 43 of the first embodiment, that abuttingly engages the first race 71'. The first race 71' according to this embodiment is wider than the first race 71 of the first embodiment shown in FIGS. 1–2. In FIG. 10, the first race 71' is provided with a second concave groove or channel 79 extending downwardly from the base leg member 41 of the cylinder base 40 as illustrated and positioned between the flexible annular flange 71*b'* and the connecting pins 75. When the pressure from the thermally expanding cylinder base 40 is applied, the first race 71' slidably moves about the connecting pin 75 and presses against the non-flexible flange 43' of the cylinder base 40. This pressure against the non-flexible flange 43' then causes the flexible annular flange 71*b'* to responsively distort inward toward the second channel 79 thereby absorbing the thermal expansion of the cylinder base 40. The second race 72 and the connecting pins 10 are preferably of the same configurations as those in the first embodiment.

Figure 11:
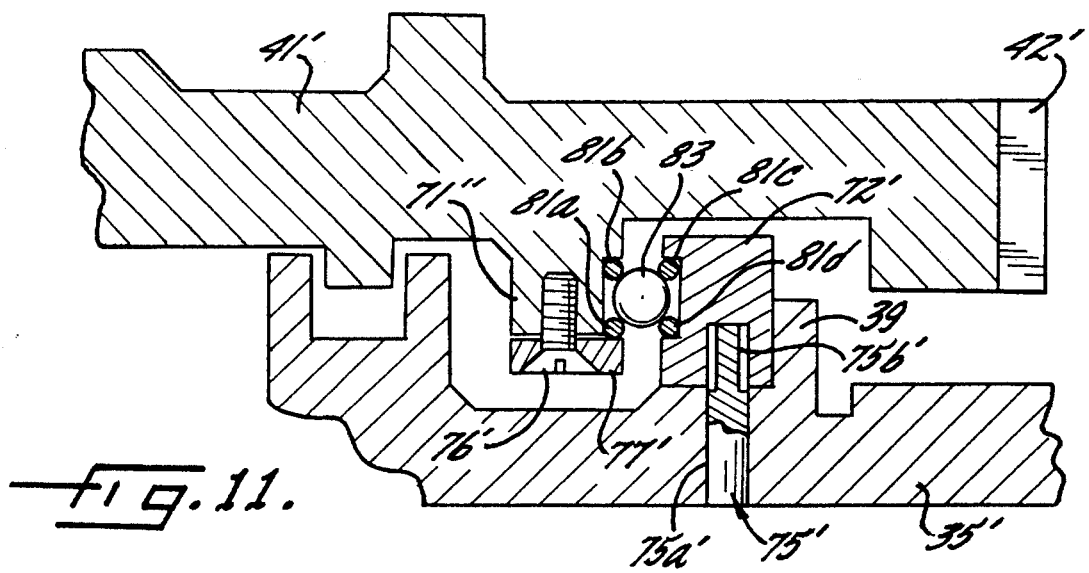
FIG. 11 illustrates a side sectional view of a fifth embodiment of a bearing assembly positioned between a cylinder base and a bed member of a circular knitting machine according to the present invention.
Figure 12:
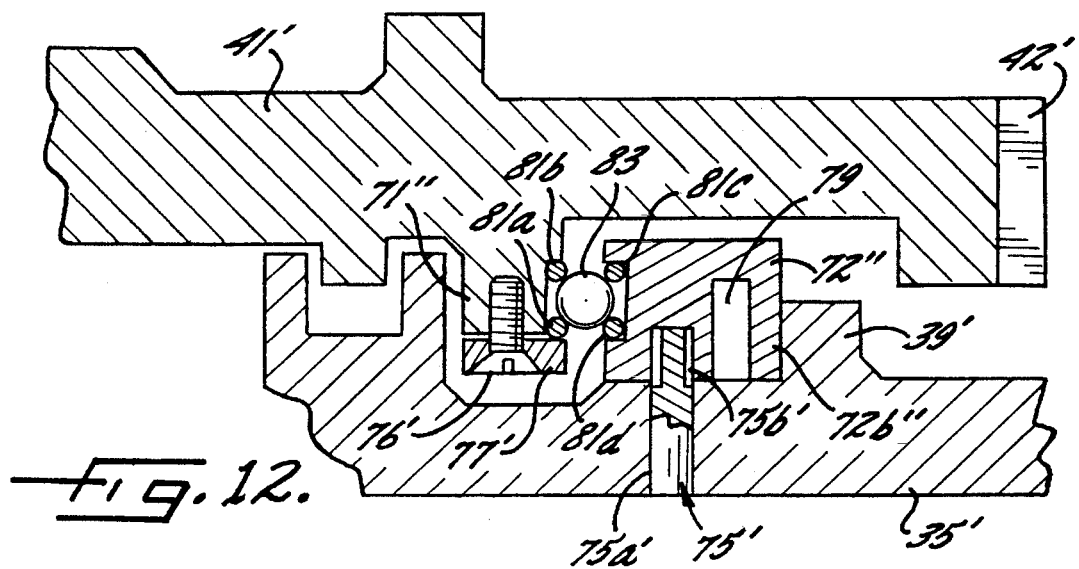
FIG. 12 illustrates a side sectional view of a sixth embodiment of a bearing assembly positioned between a cylinder base and a bed member of a circular knitting machine according to the present invention.

FIGS. 11 and 12 respectively illustrate side sectional views of a bearing assembly 70 according to fifth and sixth embodiments of the present invention. These embodiments differ from the first and fourth embodiments in that these embodiments illustrate a relatively switched mounting position of the first and second races 71, 72 of the first and fourth embodiments. In these embodiments, the first races 71" each have a generally similar configuration and are integrally formed with the cylinder base 40 in a similar manner as the second races 72 of the first and fourth embodiments. The second races 72', 72", however, are slidably connected to the bed member 30 in a similar manner as the first races 71, 71' of the first and fourth embodiments. A flexible annular flange 39 is preferably integrally formed with the bed leg member 35' in the fifth embodiment and a non-flexible annular flange 39' is integrally formed with the bed leg member in the sixth embodiment. The portions of the bearing assembly 70 of these embodiments are generally the same as the first and fourth embodiments and are not described further for brevity purposes. In other words, the relative positions of the first race 71, 71', the second race 72, and the flexible annular flange 43 of the first and fourth embodiments are respectively switched or are in opposite positions from these fifth and sixth embodiments.

Figure 15:
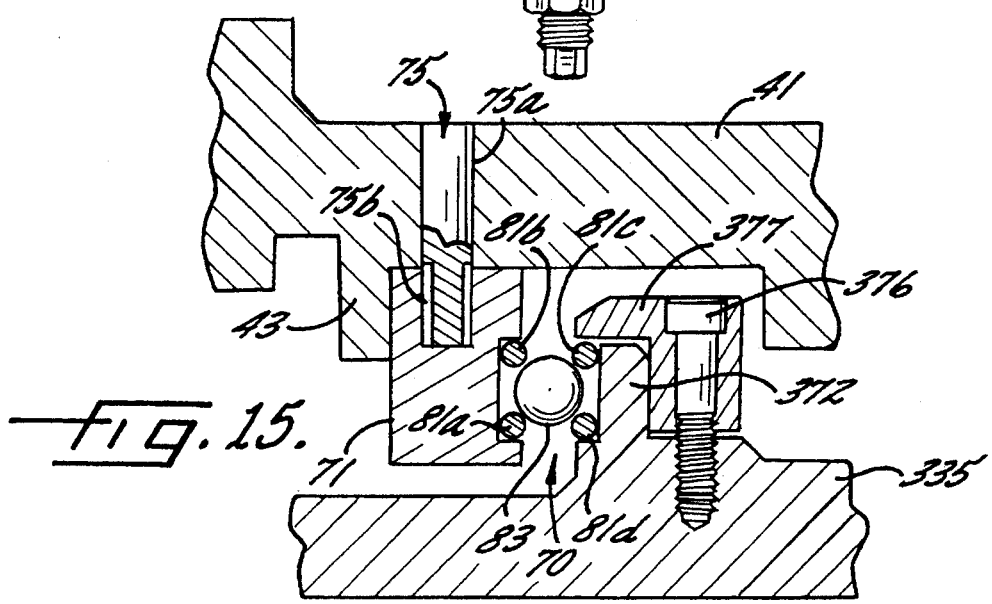
FIG. 15 illustrates a side sectional view of a ninth embodiment of a bearing assembly positioned between a cylinder base and a bed member according to the present invention.

FIGS. 14 and 15 respectively illustrate side sectional views of a bearing assembly 70 according to eighth and ninth embodiments of the present invention. In the eighth and ninth embodiments, the second races 272, 372 of the bearing assembly 70 have a different construction as illustrated. The second races 272, 372 of these embodiments have an upper flange member 277, 377 which includes a generally L-shaped section so that the body portion of the second race 272, 372 is relatively thinner than the second races 72, 72', 72", 172 of the other embodiments. As with other embodiments, the upper flange member 277, 377 of the eighth and ninth embodiments has a fastener 276, 376 that extends through the upper flange member 277, 377 and may extend only into the bed leg member 335 or may extend through the bed leg member 235 of the bed member 30 as illustrated.

In the drawings and specification, there have been disclosed typical preferred embodiments of the invention, and although specific terms are employed, the terms are used in a descriptive sense only and not for purposes of limitation. The invention has been described in considerable detail with specific reference to these various illustrated embodiments. It will be apparent, however, that various modifications and changes can be made within the spirit and scope of the invention as described in the foregoing specification and as defined in the appended claims.

What is claimed is:

1. A circular knitting machine, comprising:

a bed member;

a needle cylinder including a cylinder base rotatably mounted to said bed member;

a bearing assembly positioned between said bed member and said cylinder base for rotatable mounting of said bed member to said cylinder base, said bearing assembly including a first race separate from and slidably connected to said cylinder base, a second race connected to said bed member and positioned adjacent and spaced-apart from said first race, first and second tracks respectively mounted to said first and second races, and bearings positionally supported by and between said first and second tracks so that said cylinder base freely rotates about said bed member; and thermal-expansion compensating means integrally formed with said cylinder base and positioned closely adjacent said first race for compensating for thermal expansion in said cylinder base during heating and cooling thereof, said compensating means including a flexible base flange integrally formed with said cylinder base and positioned closely adjacent said first race so that slidable movement of said first race responsive to heating and cooling of said cylinder base thereby moves said flexible base flange.

2. A circular knitting machine as defined in claim 1, wherein said thermal expansion compensating means further comprises a connector slidably connecting said cylinder base and said first race so that said first race slidably moves about said connector responsive to heating and cooling of said cylinder base.

3. A circular knitting machine as defined in claim 2, wherein said cylinder base and said first race each have bores therein, each of said respective bores being positionally aligned and having a generally similar-sized circumference, and wherein said connector of said thermal compensating means comprises a connecting pin having an upper end portion and a lower end portion, said upper end portion being positioned within said bore of said cylinder base and said lower end portion being positioned within said bore of said first race, said lower end portion of said connecting pin having a smaller circumference than said upper end portion for providing slidable movement of said first race about said connecting pin.

4. A circular knitting machine as defined in claim 1, wherein each of said first and second races has an opposingly facing channel formed therein for mounting said first and second tracks, and wherein said second race includes a body portion integrally formed with said bed member and having a lower flange, an upper flange member detachably connected to said body portion, said lower flange and portions of said upper flange member being respectively positioned along upper and lower ends of said channel for retaining said second tracks therein, and a fastener adjustably connecting said upper flange member to said body portion.

5. A circular knitting machine as defined in claim 4, wherein said upper flange member positioned for adjusting the positioning of said second tracks, and wherein said fastener adjustably connecting said upper flange member to said body portion extends to and through a lower end portion of said bed member for providing easier access to adjustably position said second tracks.

6. A circular knitting machine as defined in claim 1, wherein said bearing assembly further comprises stopping means connected to said first and second races and positioned closely adjacent and contactingly engaging said first and second tracks for stopping rotation of said first and second tracks.

7. A circular knitting machine as defined in claim 1, wherein at least two of said plurality of bearing balls have different diameters.

8. A circular knitting machine as defined in claim 1, wherein said first and second tracks each comprise a pair of annular wire tracks having a non-circular cross-section.

9. A circular knitting machine, comprising:

a bed member;

a needle cylinder including a cylinder base rotatably mounted to said bed member;

a bearing assembly positioned between said bed member and said cylinder base for rotatable mounting of said bed member to said cylinder base, said bearing assembly including a first race separate from and slidably connected to said cylinder base, a second race slidably connected to said bed member and positioned adjacent and spaced-apart from said first race, first and second tracks respectively mounted to said first and second races, and bearings positionally supported by and between said first and second tracks so that said cylinder base freely rotates about said bed member; and thermal-expansion compensating means integrally formed with said bed member and positioned closely adjacent said second race for compensating for thermal expansion in said cylinder base during heating and cooling thereof, said compensating means including a flexible bed flange integrally formed with said bed member and positioned closely adjacent said second race so that slidable movement of said second race responsive to heating and cooling of said cylinder base thereby moves said flexible bed flange.

10. A circular knitting machine as defined in claim 9, wherein said thermal expansion compensating means further comprises a connector slidably connecting said bed member and said second race so that said second race slidably moves about said connector responsive to heating and cooling of said cylinder base.

11. A circular knitting machine as defined in claim 10, wherein said bed member and said second race each have bores therein, each of said respective bores being positionally aligned and having a generally similar-sized circumference, and wherein said connector of said thermal compensating means comprises a connecting pin having an upper end portion and a lower end portion, said upper end portion being positioned within said bore of said bed member and said lower end portion being positioned within said bore of said second race, said lower end portion of said connecting pin having a smaller circumference than said upper end portion for providing slidable movement of said second race about said connecting pin.

12. A circular knitting machine as defined in claim 9, wherein each of said first and second races has an opposingly facing channel formed therein for mounting of said first and second tracks, and wherein said first race includes a body portion integrally formed with said bed member and having a lower flange, an upper flange member detachably connected to said body portion, said lower flange and portions of said upper flange member being respectively positioned along upper and lower ends of said channel for retaining said first tracks therein, and a fastener adjustably connecting said upper flange member to said body portion.

13. A circular knitting machine as defined in claim 9, wherein said bearing assembly further comprises stopping means connected to said first and second races and positioned closely adjacent and contactingly engaging said first and second tracks for stopping rotation of said first and second tracks.

14. A circular knitting machine as defined in claim 9, wherein at least two of said plurality of bearing balls have different diameters.

15. A circular knitting machine as defined in claim 9, wherein said first and second tracks each comprise a pair of annular wire tracks having a non-circular cross-section.

16. A circular knitting machine, comprising:

a frame;

a bed member mounted to said frame and having a bed leg member extending in a generally horizontal plane;

a needle cylinder including a cylinder base having a base leg member extending in a generally horizontal plane and rotatably mounted to said bed leg member;

a bearing assembly positioned between said base leg member and said bed leg member positioned for rotatable mounting of said base leg member to said bed leg member, said bearing assembly including a first annular non-flexible race separate from and slidably connected to and extending downwardly from said base leg member, a second annular non-flexible race connected to and extending upwardly from said bed leg member and positioned adjacent and spaced-apart from said first race, said first and second annular races each having an opposingly facing channel positioned therein, first and second spaced-apart pairs of annular wire tracks respectively positioned in said channel of said first race and in said channel of said second race, and a plurality of bearing balls positionally supported by and between said first and second pairs of annular wire tracks so that said cylinder base freely rotates about said bed member; and a thermal-expansion compensator integrally formed with said first race and said cylinder base and adapted for compensating for thermal expansion in said cylinder base during heating and cooling thereof, said compensator including a connector slidably connecting said first race to said base leg member and a flexible base flange integrally formed with said base leg member, extending downwardly therefrom and positioned closely adjacent and abuttingly engaging said first race so that said first race slidably moves about said connector responsive to heating and cooling of said cylinder base and thereby moves said flexible base flange.

17. A circular knitting machine as defined in claim 16, wherein said second non-flexible race includes a body portion integrally formed with said bed leg member and having a lower flange, an upper flange member detachably connected to body portion, said lower flange and portions of said upper flange member being respectively positioned along upper and lower ends of said channel for retaining said first pair of wire tracks therein, and a fastener adjustably connecting said upper flange member to said body portion.

18. A circular knitting machine as defined in claim 17, wherein said upper flange member for adjusting the positioning of one of said pairs of annular wire tracks, and wherein said fastener adjustably connecting said upper flange member to said body portion extends to and through a lower end portion of said bed leg member for providing easier access to adjustably position said annular wire tracks.

19. A circular knitting machine as defined in claim 16, wherein said connector of said thermal expansion compensator is a pin comprising an upper end portion and a lower end portion, said upper end portion being positioned within said cylinder base and said lower end portion positioned within said first race, said lower end portion having a smaller circumference than said upper end portion.

20. A circular knitting machine as defined in claim 19, wherein said upper end portion is cylindrical and said lower end portion is non-cylindrical, said lower non-cylindrical end portion having a pair of relatively flat parallel sides and a pair of arcuate sides.

21. A circular knitting machine as defined in claim 16, wherein at least two of said plurality of bearing balls have different diameters.

22. A circular knitting machine as defined in claim 16, wherein said wire tracks each have a non-circular cross-section.

23. A circular knitting machine as defined in claim 22, wherein said wire tracks each have a rectangular cross-section.

24. A circular knitting machine as defined in claim 16, wherein said bearing assembly further comprises four stop members each respectively positioned closely adjacent each of said wire tracks and adapted for stopping rotation of said wire tracks.

25. A circular knitting machine as defined in claim 24, wherein a first pair of said stop members is connected to said first race and said pair of wire tracks positioned therein and a second pair of said stop members is connected to said second race and said second pair of wire tracks positioned therein.

26. A circular knitting machine, comprising:

a frame;

a bed member mounted to said frame and having a bed leg member extending in a generally horizontal plane;

a needle cylinder including a cylinder base having a base leg member extending in a generally horizontal plane and rotatably mounted to said bed leg member;

a bearing assembly positioned between said base leg member and said bed leg member positioned for rotatable mounting of said base leg member to said bed leg member, said bearing assembly including a first annular non-flexible race separate from and slidably connected to and extending downwardly from said base leg member, a second annular non-flexible race slidably connected to and extending upwardly from said bed leg member and positioned adjacent and spaced-apart from said first race, said first and second annular races each having an opposingly facing channel positioned therein, first and second spaced-apart pairs of annular wire tracks respectively positioned in said channel of said first race and in said channel of said second race, and a plurality of bearing balls positionally supported by and between said first and second pairs of annular wire tracks so that said cylinder base freely rotates about said bed member; and a thermal-expansion compensator integrally formed with said second race and said bed member adapted for compensating for thermal expansion in said cylinder base during heating and cooling thereof, said compensator including a connector slidably connecting said second race to said bed leg member and a flexible bed flange integrally formed with said bed leg member, extending upwardly from said bed leg member, and positioned closely adjacent and abuttingly engaging said second race so that said second race slidably moves about said connector responsive to heating and cooling of said cylinder base and thereby moves said flexible bed flange.

27. A circular knitting machine as defined in claim 26, wherein said first non-flexible race includes a body portion integrally formed with said base leg member and having a lower flange, an upper flange member detachably connected to said body portion, said lower flange and portions of said upper flange member being respectively positioned along upper and lower ends of said channel for retaining said first pair of wire tracks therein, and a fastener adjustably connecting said upper flange member to said body portion.

28. A circular knitting machine as defined in claim 26, wherein said connector of said thermal expansion compensator is a pin comprising an upper end portion and a lower end portion, said upper end portion being positioned within said bed leg member and said lower end portion positioned within said second race, said lower end portion having a smaller circumference than said upper end portion.

29. A circular knitting machine as defined in claim 28, wherein said upper end portion is cylindrical and said lower end portion is non-cylindrical, said lower non-cylindrical end portion having a pair of relatively flat parallel sides and a pair of arcuate sides.

30. A circular knitting machine as defined in claim 26, wherein at least two of said plurality of bearing balls have different diameters.

31. A circular knitting machine as defined in claim 26, wherein said wire tracks each have a non-circular cross-section.

32. A circular knitting machine as defined in claim 31, wherein said wire tracks each have a rectangular cross-section.

33. A circular knitting machine as defined in claim 26, wherein said bearing assembly further comprises four stop members each respectively positioned closely adjacent each of said wire tracks and adapted for stopping rotation of said wire tracks.

34. A circular knitting machine as defined in claim 33, wherein a first pair of said stop members is connected to said first race and said pair of wire tracks positioned therein and a second pair of said stop members is connected to said second race and said second pair of wire tracks positioned therein.

35. A bearing assembly for connecting to and positioning between a bed member and a base of a needle cylinder of a circular knitting machine, said bearing assembly comprising:

a first non-flexible race adapted to slidably connect to a base of a needle cylinder of a circular knitting machine;

a second non-flexible race adapted to connect to a bed member of a circular knitting machine, said second race being positioned adjacent and spaced-apart from said first race, said first and second races each having an opposingly facing channel positioned therein;

first and second spaced-apart pairs of tracks respectively positioned in said channel of said first race and in said channel of said second race;

a plurality of bearing balls positionally supported by and between said first and second pairs of tracks so that the base of the needle cylinder freely rotates about the bed member; and thermal-expansion compensating means integrally formed with the base of the needle cylinder and positioned closely adjacent said first race for compensating for thermal expansion in the base during heating and cooling thereof, said compensating means including a connector for slidably connecting said first race to the base and a flexible base flange integrally formed with the base and positioned closely adjacent said first race so that said first race slidably moves about said connector responsive to heating and cooling of the base of the needle cylinder and thereby moves said flexible base flange.

36. A bearing assembly as defined in claim 35, wherein said second non-flexible race includes a body portion integrally formed with said bed member and having a lower flange, an upper flange member detachably connected to said body portion, said lower flange and portions of said upper flange member being respectively positioned along upper and lower ends of said channel for retaining said second pair of tracks therein, and a fastener adjustably connecting said upper flange member to said body portion.

37. A circular knitting machine as defined in claim 36, wherein said upper flange member positioned for adjusting the positioning of one of said pairs of tracks, and wherein said fastener adjustably connecting said upper flange member to said body portion extends to and through a lower end portion of said bed member for providing easier access to adjustably position said tracks.

38. A bearing assembly as defined in claim 35, wherein said connector of said thermal compensating means comprises a pin having an upper end portion and a lower end portion, said upper end portion being positioned within said cylinder base and said lower end portion positioned within said first race, said lower end portion having a smaller circumference than said upper end portion.

39. A bearing assembly as defined in claim 38, wherein said upper end portion is cylindrical and said lower end portion is non-cylindrical, said lower non-cylindrical end portion having a pair of relatively flat parallel sides and a pair of arcuate sides.

40. A bearing assembly as defined in claim 35, wherein at least two of said plurality of bearing balls have different diameters.

41. A bearing assembly as defined in claim 35, wherein said first and second tracks each comprise a pair of annular wire tracks having a non-circular cross-section.

42. A bearing assembly as defined in claim 35, further comprising four stop members each respectively positioned closely adjacent each of said tracks and adapted for stopping rotation of said tracks.

43. A bearing assembly as defined in claim 42, wherein a first pair of said stop members is connected to said first race and said pair of tracks positioned therein and a second pair of said stop members is connected to said second race and said second pair of tracks positioned therein.

44. A bearing assembly for connecting to and positioning between a bed member and a base of a needle cylinder of a circular knitting machine, said bearing assembly comprising:

a first race adapted to connect to a base of a needle cylinder of a circular knitting machine;

a second race adapted to slidably connect to a bed member of a circular knitting machine, said second race being positioned adjacent and spaced-apart from said first race, said first and second races each having an opposingly facing channel positioned therein;

first and second spaced-apart pairs of annular tracks respectively positioned in said channel of said first race and in said channel of said second race;

a plurality of bearing balls positionally supported by and between said first and second pairs of annular tracks so that the base of the needle cylinder freely rotates about the bed member; and thermal-expansion compensating means integrally formed with the bed member and positioned closely adjacent said second race for compensating for thermal expansion in the base during heating and cooling thereof, said compensating means including a connector for slidably connecting said second race to the bed member and a flexible bed flange integrally formed with the bed member and positioned closely adjacent said second race so that said first race slidably moves about said connector responsive to heating and cooling of the base of the needle cylinder and thereby moves said flexible bed flange.

45. A bearing assembly as defined in claim 44, wherein said first non-flexible race includes a body portion integrally formed with said bed member and having a lower flange, an upper flange member detachably connected to said body portion, said lower flange and portions of said upper flange member being respectively positioned along upper and lower ends of said channel for retaining said first pair of wire tracks therein, and a fastener adjustably connecting said upper flange member to said body portion.

46. A bearing assembly as defined in claim 44, wherein said connector of said thermal compensating means comprises a pin having an upper end portion and a lower end portion, said upper end portion being positioned within said bed member and said lower end portion positioned within said second race, said lower end portion having a smaller circumference than said upper end portion.

47. A bearing assembly as defined in claim 46, wherein said upper end portion is cylindrical and said lower end portion is non-cylindrical, said lower non-cylindrical end portion having a pair of relatively flat parallel sides and a pair of arcuate sides.

48. A bearing assembly as defined in claim 44, wherein at least two of said plurality of bearing balls have different diameters.

49. A bearing assembly as defined in claim 44, wherein said first and second tracks each comprise a pair of annular wire tracks having a non-circular cross-section.

50. A bearing assembly as defined in claim 44, further comprising four stop members each respectively positioned closely adjacent each of said tracks and adapted for stopping rotation of said tracks.

51. A bearing assembly as defined in claim 50, wherein a first pair of said stop members is connected to said first race and said pair of tracks positioned therein and a second pair of said stop members is connected to said second race and said second pair of tracks positioned therein.

52. A circular knitting machine, comprising:

a frame;

a bed member mounted to said frame and having a bed leg member extending in a generally horizontal plane;

a needle cylinder including a cylinder base having a base leg member extending in a generally horizontal plane and rotatably mounted to said bed leg member;

a bearing assembly positioned between said base leg member and said bed leg member positioned for rotatable mounting of said base leg member to said bed leg member, said bearing assembly including a first annular race separate from and slidably connected to and extending downwardly from said base leg member, a second annular non-flexible race connected to and extending upwardly from said bed leg member and positioned adjacent and spaced-apart from said first race, said first and second annular races each having an opposingly facing channel positioned therein, first and second spaced-apart pairs of annular wire tracks respectively positioned in said channel of said first race and in said channel of said second race, and a plurality of bearing balls positionally supported by and between said first and second pairs of annular wire tracks so that said cylinder base freely rotates about said bed member; and thermal-expansion compensating means integrally formed with said first race and said cylinder base for compensating for thermal expansion in said cylinder base during heating and cooling thereof, said compensating means including a connector slidably connecting said first race to said base leg member, a non-flexible base flange integrally formed with said base leg member, extending downwardly therefrom and positioned closely adjacent and abuttingly engaging said first race, a channel formed in said first race and extending downward from said base leg member, and a flexible race flange positioned between said downward extending channel and said non-flexible base flange so that said first race slidably moves about said connector responsive to heating and cooling of said cylinder base and thereby moves said flexible race flange.

53. A circular knitting machine as defined in claim 52, wherein said second non-flexible race includes a body portion integrally formed with said bed leg member and having a lower flange, an upper flange member detachably connected to body a portion, said lower flange and portions of said upper flange member being respectively positioned along upper and lower ends of said channel for retaining said first pair of wire tracks therein, and a fastener adjustably connecting said upper flange member to said body portion.

54. A circular knitting machine as defined in claim 53, wherein said upper flange member positioned for adjusting the positioning of one of said pairs of annular wire tracks, and wherein said fastener adjustably connecting said upper flange member to said body portion extends to and through a lower end portion of said bed leg member for providing easier access to adjustably position said annular wire tracks.

55. A circular knitting machine as defined in claim 52, wherein said connector of said thermal compensating means is a pin comprising an upper end portion and a lower end portion, said upper end portion being positioned within said cylinder base and said lower end portion positioned within said first race, said lower end portion having a smaller circumference than said upper end portion.

56. A circular knitting machine as defined in claim 55, wherein said upper end portion is cylindrical and said lower end portion is non-cylindrical, said lower non-cylindrical end portion having a pair of relatively flat parallel sides and a pair of arcuate sides.

57. A circular knitting machine as defined in claim 52 wherein at least two of said plurality of bearing balls have different diameters.

58. A circular knitting machine as defined in claim 52, wherein said wire tracks each have a non-circular cross-section.

59. A circular knitting machine as defined in claim 52, wherein said bearing assembly further comprises four stop members each respectively positioned closely adjacent each of said wire tracks and adapted for stopping rotation of said wire tracks.

60. A circular knitting machine as defined in claim 59, wherein a first pair of said stop members is connected to said first race and said pair of wire tracks positioned therein and a second pair of said stop members is connected to said second race and said second pair of wire tracks positioned therein.

61. A circular knitting machine, comprising:

a frame;

a bed member mounted to said frame and having a bed leg member extending in a generally horizontal plane;

a needle cylinder including a cylinder base having a base leg member extending in a generally horizontal plane and rotatably mounted to said bed leg member;

a bearing assembly positioned between said base leg member and said bed leg member positioned for rotatable mounting of said base leg member to said bed leg member, said bearing assembly including a first annular non-flexible race connected to and extending downwardly from said base leg member, a second annular race separate from and slidably connected to and extending upwardly from said bed leg member and positioned adjacent and spaced-apart from said first race, said first and second annular races each having an opposingly facing channel positioned therein, first and second spaced-apart pairs of annular wire tracks respectively positioned in said channel of said first race and in said channel of said second race, and a plurality of bearing balls positionally supported by and between said first and second pairs of annular wire tracks so that said cylinder base freely rotates about said bed member; and thermal-expansion compensating means integrally formed with said second race and said bed member for compensating for thermal expansion in said cylinder base during heating and cooling thereof, said compensating means including a connector slidably connecting said second race to said bed leg member, a non-flexible bed flange integrally formed with said bed leg member, extending upwardly from said bed leg member, and positioned closely adjacent and abuttingly engaging said second race, a channel formed in said second race and extending upwardly from said bed leg member, and a flexible race flange positioned between said upwardly extending channel and said non-flexible bed flange so that said second race slidably moves about said connector responsive to heating and cooling of said cylinder base and thereby moves said flexible race flange.

62. A circular knitting machine as defined in claim 61, wherein said first non-flexible race includes a body portion integrally formed with said base leg member and having a lower flange, an upper flange member detachably connected to said body portion, said lower flange and portions of said upper flange member being respectively positioned along upper and lower ends of said channel for retaining said first pair of wire tracks therein, and a fastener adjustably connecting said upper flange member to said body portion.

63. A circular knitting machine as defined in claim 61, wherein said connector of said thermal compensating means is a pin comprising an upper end portion and a lower end portion, said upper end portion being positioned within said bed leg member and said lower end portion positioned within said second race, said lower end portion having a smaller circumference than said upper end portion.

64. A circular knitting machine as defined in claim 63, wherein said upper end portion is cylindrical and said lower end portion is non-cylindrical, said lower non-cylindrical end portion having a pair of relatively flat parallel sides and a pair of arcuate sides.

65. A circular knitting machine as defined in claim 61, wherein at least two of said plurality of bearing balls have different diameters.

66. A circular knitting machine as defined in claim 61, wherein said wire tracks each have a non-circular cross-section.

67. A circular knitting machine as defined in claim 61, wherein said bearing assembly further comprises four stop members each respectively positioned closely adjacent each of said wire tracks and adapted for stopping rotation of said wire tracks.

68. A circular knitting machine as defined in claim 67, wherein a first pair of said stop members is connected to said first race and said pair of wire tracks positioned therein and a second pair of said stop members is connected to said second race and said second pair of wire tracks positioned therein.

* * * * *